United States Patent
Donley et al.

(10) Patent No.: US 9,838,526 B2
(45) Date of Patent: Dec. 5, 2017

(54) SWITCHING BETWEEN WATCHES OR OTHER ACCESSORIES

(71) Applicant: Apple Inc., Cupertino, CA (US)

(72) Inventors: David C. Donley, Santa Clara, CA (US); Julien A. Poumallioux, San Francisco, CA (US); Pierre J. De Fillippis, Sunnyvale, CA (US); Tyler D. Hawkins, San Jose, CA (US); Craig P. Dooley, Cupertino, CA (US); Daniel B. Pollack, San Jose, CA (US); James C. Grandy, Redwood City, CA (US); Gregory B. Novick, San Francisco, CA (US); Todd A. Shortlidge, San Francisco, CA (US); Aroon Pahwa, Palo Alto, CA (US); David T Wilson, Cupertino, CA (US); Yan Yang, San Jose, CA (US); Nicholas Joseph Circosta, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/273,414

(22) Filed: Sep. 22, 2016

(65) Prior Publication Data
US 2017/0201611 A1    Jul. 13, 2017

Related U.S. Application Data

(60) Provisional application No. 62/276,923, filed on Jan. 10, 2016.

(51) Int. Cl.
*H04B 7/00* (2006.01)
*H04M 1/725* (2006.01)
*H04W 56/00* (2009.01)

(52) U.S. Cl.
CPC ..... *H04M 1/7253* (2013.01); *H04M 1/72583* (2013.01); *H04W 56/0025* (2013.01);
(Continued)

(58) Field of Classification Search
None
See application file for complete search history.

(56) References Cited

U.S. PATENT DOCUMENTS

2008/0125186 A1  5/2008 Chen et al.
2009/0180355 A1* 7/2009 Cartwright ............. G04G 21/00
                                                    368/12
(Continued)

FOREIGN PATENT DOCUMENTS

WO   WO 2015/116163 A1   8/2015

OTHER PUBLICATIONS

Timothy M. Johnson et al., "Systems and Methods for Facilitating Health Research Using a Personal Wearable Device", U.S. Appl. No. 62/235,210, filed Sep. 30, 2015.

*Primary Examiner* — Mohammed Rachedine
(74) *Attorney, Agent, or Firm* — Blakely, Sokoloff, Taylor & Zafman LLP

(57) ABSTRACT

Systems, methods and non-transitory computer readable media for allowing a user to switch between watches that have been paired with a device such as a smartphone are described. In one embodiment, the watches automatically detect a removal of a first watch from a user's wrist and an attachment of a second watch to the user's wrist. Messages from the watches are transmitted to the device to allow the device to switch the active watch from the first watch to the second watch. The switch can occur while the device is in a locked state, and the device can synchronize the second watch with data received from the first watch. Other embodiments are also described.

21 Claims, 10 Drawing Sheets

(52) U.S. Cl.
  CPC ............... *H04M 2203/6018* (2013.01); *H04M 2203/6054* (2013.01); *H04M 2250/02* (2013.01)

(56) References Cited

U.S. PATENT DOCUMENTS

| | | | |
|---|---|---|---|
| 2014/0220894 A1* | 8/2014 | Chen | H04W 12/06 455/41.2 |
| 2015/0351038 A1 | 12/2015 | Dooley et al. | |
| 2016/0261299 A1* | 9/2016 | Hosoi | G06F 1/163 |
| 2017/0091412 A1 | 3/2017 | Johnson | |
| 2017/0091426 A1 | 3/2017 | Johnson | |

\* cited by examiner

FILTER LOGIC

| BINARY PAYLOAD | VALUE | WRIST STATE |
| --- | --- | --- |
| 0 0 0 0 0 0 0 0 | 0 | 0 |
| 0 0 0 0 0 0 0 1 | 1 | |
| 0 0 0 0 0 0 1 1 | 2 | LOW |
| 0 0 0 0 0 1 1 1 | 3 | |
| 0 0 0 0 1 1 1 1 | 4 | MEDIUM ← 1249 |
| 0 0 0 1 1 1 1 1 | 5 | |
| 0 0 1 1 1 1 1 1 | 6 | HIGH |
| 0 1 1 1 1 1 1 1 | 7 | |
| 1 1 1 1 1 1 1 1 | 8 | |

1250

SWITCHING BETWEEN WATCHES OR OTHER ACCESSORIES

This application claims the benefit of U.S. Provisional Patent Application No. 62/276,923, filed on Jan. 10, 2016, which application is incorporated herein by reference.

BACKGROUND OF THE INVENTION

The embodiments described herein relate to an accessory for a companion device, such as a watch or fitness tracker for a smartphone.

Watches and fitness trackers can be paired, typically though Bluetooth wireless communication, with a companion device to provide health tracking functions and potentially other capabilities. For example, a Fitbit device or an Apple Watch can gather health data through one or more sensors and then transmit this health data to the companion device which can be a data processing system such as a smartphone or tablet computer or laptop computer, etc. An Apple Watch can also provide other functions such as notifications of messages, emails, voicemails, etc. and many other functions which can be provided by apps that execute on the watch.

SUMMARY OF THE DESCRIPTION

The embodiments described herein allow a user to switch between a set of accessories, such as a set of watches that have been paired with a device such as a companion device. In one embodiment, the watches automatically detect a removal of a first watch from a user's wrist and an attachment of a second watch to the user's wrist. Messages from the watches are transmitted to the companion device to allow the companion device to switch the active watch from the first watch to the second watch. This switch can occur while the companion device is in a locked state, and the companion device can synchronize the second watch with data received from the first watch.

According to one aspect of the embodiments described herein, a method for switching between watches can include the following operations: detecting removal of a first watch which has been synchronized at least partially with a companion device and detecting attachment of a second watch, each of the first watch and the second watch having been paired with the companion device; transmitting data from the companion device to the second watch to synchronize the second watch with the companion device in response to detecting attachment of the second watch and removal of the first watch, wherein the transmitted data originated from the first watch. In one embodiment, the detection of the removal includes receiving a first wrist state from the first watch, and wherein detecting attachment includes receiving a second wrist state from the second watch. The detection of removal and the detection of attachment can occur when the second wrist state indicates a higher on-wrist confidence level than the first wrist state. In one embodiment, the detection of removal and the detection of attachment can occur automatically without user intervention or user input and can occur while the companion device remains in a locked state throughout the entire switch process. Thus, in one embodiment, a user can seamlessly switch between the watches without having to provide any input to the companion device or to the watches and the process is performed automatically by the watches and the companion device without any user input.

In one embodiment, the transmission of the data from the companion device to the second watch to synchronize the second watch can be performed while the companion device is locked. When the companion device is locked, it requires a user's security input to unlock it to allow the companion device to receive further input. In one embodiment, the user's security input is one of: a password; a numeric passcode; a two dimensional gesture on a touchscreen; a biometric input such as a fingerprint, voice input, retina scan or image of a user's face.

In one embodiment, the wrist states from each watch are derived from one or more sensors on each watch, and the wrist states from inactive paired watches are received through a Bluetooth advertisement which includes an advertising identifier as well as the current wrist state of the watch derived from the sensors on the watch. In one embodiment, the companion device can be one of a smartphone or tablet computer or other data processing system which can include a cellular telephone transceiver, a WiFi transceiver, and a Bluetooth transceiver, and the companion device is paired through Bluetooth with the set of paired watches which can include the first watch and the second watch. In one embodiment, the first watch and the second watch can use the same advertising identifier in the Bluetooth advertisements which are sent from each watch.

In one embodiment, the companion device can provide a user interface on a touchscreen, such as the touchscreen of a smartphone or tablet computer to allow a user to select one of either: automatic watch switching or manual watch switching. If automatic watch switching is selected, one or more of the methods described herein can be performed to allow switching between watches without any user input. If manual watch switching is selected from the user interface then user interaction or user input is required to cause a switching of watches.

In one embodiment, the process for switching between watches can include a last chance synchronization operation which is performed after detecting removal of the first watch and after detecting attachment of the second watch but prior to the second watch becoming the active watch. This last chance synchronization can provide a mechanism for the first watch to transmit health data to the companion device which can then be transmitted to the second watch after the second watch becomes the active watch, and this transmission of health data can be performed automatically without user input and can also be performed while the companion device remains locked. In one embodiment the transmission of this health data can be performed either after unlocking the second watch or before unlocking the second watch.

According to another aspect to the embodiments described herein, a method for operating a watch that is paired with the companion device can include the following operations: transmitting, through a Bluetooth advertisement message, a wrist state of the watch to the companion device, the wrist state indicating an on-wrist confidence level that is higher than an on-wrist confidence level of another watch, the difference in on-wrist confidence levels indicating a switch from the another watch to the watch; receiving, from the companion device, data to synchronize the watch with the companion device in response to the switch, the data from the companion device having originated from the another watch. In one embodiment, the data from the companion device that originated from the another watch includes health data collected by the another watch through one or more sensors on the another watch. The another watch and the watch are paired with the companion device for Bluetooth communication.

According to another aspect of the embodiments described herein, a method for synchronizing a new active watch with data from a prior active watch can include the following operations: receiving, at a companion device, data from a first paired device or watch that is paired with the companion device, the first paired device being the active paired device when the data is received; storing the received data in a first store of the companion device, wherein once the data is stored in the first store, the data cannot be accessed when the companion device is locked; storing the received data in a second store of the companion device, the received data in the second store for use in synchronizing a second paired device, such as a watch, with the companion device when the second paired device becomes the active paired device and the first paired device is no longer the active paired device. This method can also include transmitting at least a portion of the data in the second store to the second paired device in response to the second paired device becoming the active paired device. This transmission can occur while the companion device remains in a lock state, and the second paired device can decrypt the portion of the data in response to unlocking the second paired device. In one embodiment, the first store and the second store are different databases, and the data in the second store is intended to be used for currently inactive paired watches or devices when that data is stored in the second store so that those currently inactive devices can be synchronized with data (from the second store) that originated from the currently active paired device when a switch of paired devices occurs.

In one embodiment, the first paired device can transmit its wrist state when it is the active paired device and the second paired device can transmit its wrist state in a Bluetooth advertisement message. In one embodiment, the data in the first store is stored in an encrypted state and the data in the second store is stored in an encrypted state that can be decrypted by one or more currently inactive paired devices, such as an inactive paired watch. The data stored in the first store can be encrypted with one or more keys that are different than the one or more keys used to encrypt the data in the second store.

In one embodiment, when the companion device is unlocked from the locked state the health data in the second store is updated with at least synchronization anchors for use in synchronizing inactive watches in the future. Prior to this updating, the health data in the second store does not include synchronization anchors in one embodiment.

According to another aspect of the embodiments described herein, a data processing system, such as one of the companion devices described herein, can include the following: one or more application processes for executing an operating system and one or more user applications on the data processing system which can be a wireless communication device, wherein the one or more application processors can have at least one sleep state and at least one run state which consumes more power than the sleep state; a radio controller which includes filter logic, a radio controller coupled to the one or more application processors to receive, from the one or more application processors, one or more values representing wrist states for processing by the filter logic; a radio transceiver coupled to the radio controller, the radio transceiver configured to receive one or more wrist states from an active paired watch and one or more wrist states from one or more inactive paired watches, and the radio transceiver is configured to provide these wrist states to the radio controller which is configured, through the filter logic, to prevent waking up of the one or more application processors from the sleep state when all of the one or more inactive paired watches have a wrist state that indicates a lower on-wrist confidence level than a most recent wrist state from the active paired watch, and the radio controller is configured, through the filter logic, to wake up the one or more application processors from the sleep state when any one of the one or more inactive paired watches has a wrist state that indicates a higher on-wrist confidence level than the most recent wrist state from the active paired watch. The active paired watch and the one or more inactive paired watches can be paired with the data processing system through Bluetooth. The one or more inactive paired watches can use Bluetooth advertisements with the same advertising identifier in the Bluetooth advertisements, and these Bluetooth advertisements include the wrist states from the one or more inactive paired watches. In one embodiment, the one or more application processors wake up to switch which paired watch is the active paired watch. In one embodiment, the data processing system and the active paired watch use an encrypted communication protocol sent over Bluetooth communication signals, and the encrypted communication protocol is established after the data processing system and the active paired watch have both been unlocked by a user's input. In one embodiment, the application processors can provide to the radio controller one or more parameters representing a scan interval to cause the radio transceiver to scan for Bluetooth advertisements from the one or more inactive watches according to the scan interval which can represent a period of time. In one embodiment, the values representing the wrist states received from the one or more application processors configures the filter logic to filter out instances where the scans of the Bluetooth signals reveal that the current active watch still has the highest on-wrist confidence level.

According to another aspect of the embodiments described herein, a method for determining a switch between accessories (e.g. a pair of watches) can include the following operations: scanning, by a companion device, for one or more wrist states from one or more paired accessories; determining, based on a difference in wrist states, that a switch between accessories has occurred, where the switch is from a first accessory to a second accessory; starting a timer (e.g., a 10 second timer) in response to determining that the switch has occurred; ceasing, during a period of time before the timer expires, scanning for wrist states of other accessories; determining, during the period of time before the timer expires, whether the second accessory has established a communication connection for data exchange with the companion; reverting, in response to the timer's expiration, to scanning for one or more wrist states from the one or more accessories. In one embodiment, the wrist states can, generally speaking, indicate a state (e.g. on or off) of a position of the corresponding accessory relative to a body of a user of the companion device (such as on wrist or off wrist confidence levels; or on head or off head confidence levels, etc.). In one embodiment, the scanning can involve receiving and processing Bluetooth advertisements which include the one or more wrist states, and in one embodiment the ceasing of the scanning can include not processing the received Bluetooth advertisements or not receiving and not processing the Bluetooth advertisements. In one embodiment, the companion device transmits synchronization data to the second accessory in response to determining that the second accessory and the companion device have established the communication connection, and the companion device can transmit the synchronization data to the second accessory while the companion device is locked.

The embodiments described herein can include companion devices, accessory devices, such as watches, and other data processing systems and also include the various methods described herein. The methods described herein can be implemented by one or more data processing systems which execute executable instructions, stored on one or more non-transitory machine readable media, that cause the one or more data processing systems to perform one or more of the methods described herein. Thus, the embodiments described herein include data processing systems, methods, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein relate to systems and methods for switching between accessories of a companion device, where the accessories can be, for example, paired watches that have been paired with the companion device to allow for wireless communication such as wireless communication through Bluetooth. It will be appreciated that the accessories may be watches or other devices, such as GPS trackers, fitness trackers, glasses (e.g., virtual reality head mounted displays), jewelry, shoes or clothes or other wearable items, heart monitor, health sensor, glucose monitor, audio accessory (e.g., headphone or earphone) and other accessories that can operate with a companion device. Thus, even though the following description focuses on watches, the embodiments can include other types of accessories, and a switch can occur between different types of accessories (e.g., a switch between a watch and a head mounted display).

Figure 1:
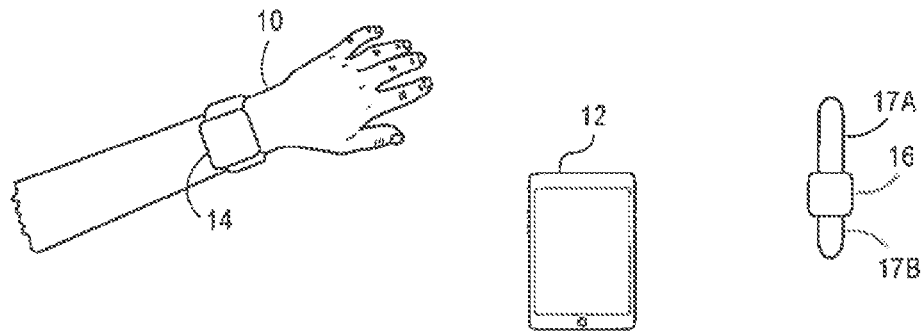
FIG. 1 shows an example of a set of devices which includes the companion device and two paired watches, one of which is active and the other which is inactive.

FIG. 1 shows a companion device 12 which can be paired with a plurality of accessories, such as the watches 14 and 16. The pairing process can be a conventional Bluetooth pairing operation as is known in the art. The companion device 12 can be a smartphone or a tablet computer or a laptop computer or other consumer electronic device that can be paired with the multiple accessories. As shown in FIG. 1, the watch 14 is being worn by the user and is currently on the user's wrist 10. The watch 16 and the companion device 12 can be both near the user. For example, the companion device 12 can be in the user's shirt pocket or next to the user. Similarly, the watch 16, which includes straps 17A and 17B to attach to the user's wrist, can be adjacent to the user. The proximity of the devices allows the Bluetooth radio systems which are used in one embodiment to communicate as all three devices are within Bluetooth range of each other. In one embodiment, the user can have the companion device 12 in a pocket or briefcase or purse or on a desk while the user removes the watch 14 and places the watch 16 on the wrist 10. As is described further below, the watches 14 and 16 can be transmitting signals that indicate on-wrist confidence levels to the companion device which can then decide that the watches have been switched so that the watch 16 should now be made the active watch and the watch 14, which was the active watch while it was on-wrist, will now be made the inactive watch. Before describing further details about the various embodiments discussed herein, an overview of the hardware of an accessory, such as a watch, will be provided in conjunction with FIG. 2.

Figure 2:
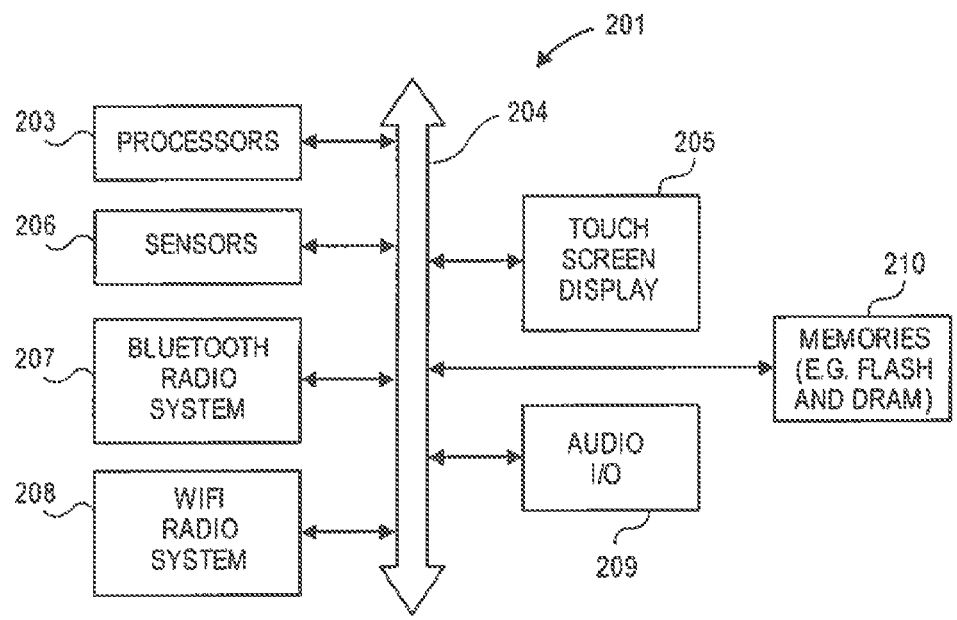
FIG. 2 is a block diagram showing an example of an accessory for a companion device, such as a watch.

The watch 201 in FIG. 2 can include one or more processors 203 which are coupled through one or more buses 204 as is known in the art to the rest of the components of the watch. Those additional components can include one or more sensors 206, a touch screen display 205 which both displays images to the user and also can receive touch inputs on the screen of the display as is known in the art. In addition, the watch 201 can include a Bluetooth radio system 207 and a WiFi radio system 208. The watch 201 also includes one or more memories 210 which can include flash memory. DRAM memory and ROM memory as is known in the art. These memories can store data, such as wrist states and also store executable computer program instructions which can cause the watch to operate as described herein. In addition, the watch 201 can include audio input/output 209 such as a microphone and one or more speakers 209. The sensors 206 can include one or more accelerometers or motion detectors or orientation detectors or other sensors which can sense when a wrist is raised or lowered. The sensors 206 can also include sensors that sense a proximity to a wrist or sense reflections from a wrist, such as LED based sensors that generate LED light and then sense reflected LED light that has been reflected by the wrist's skin. These sensors can be used as described herein to determine the on-wrist state or on-wrist confidence level which then can be transmitted to a companion device, such as the companion device 12 shown in FIG. 1. It will be appreciated that other types of sensors can also (or alternatively) be used such as a sensor in a buckle; see for example published PCT Application PCT/US2014/01451 (International Publication No. WO 2015/116163). The watch 201 can represent the hardware and software architecture of watches 14 and 16 in FIG. 1 or watches 251 and 253 shown in FIG. 3. Similarly, the watch 201 shown in FIG. 2 can be used to implement the watches 403 and 405 in FIG. 4 and the watches 1010 and 1012 in FIG. 10.

Figure 3:
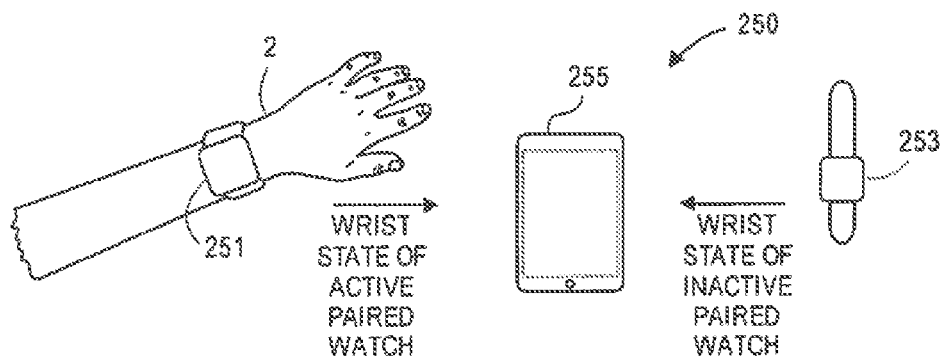
FIG. 3 shows a set of paired watches which communicate with a companion device to allow the companion device to perform a switch between the watches.

Referring now to FIG. 3, a set of devices 250 can include a companion device 255, a watch 251, and a watch 253. The watch 251 is the currently active paired watch while the watch 253 is the inactive paired watch. The active paired watch is shown on the user's wrist 2 while the inactive paired watch may be in the user's purse or pocket or on a table next to the user. A companion device 255 may be in the user's pocket or purse or briefcase or near the user on a table which is near the user. In the example shown in FIG. 3, the watches 251 and 253 are within radio range for the Bluetooth systems that are contained within each of the watches 251 and 253 and also within the companion device 255. In one embodiment, the companion device 255 can be a smartphone or other consumer electronic device. While the watch 251 is within Bluetooth radio range of companion device 255, the watch 251 can repeatedly transmit one or more wrist state values indicating an on-wrist confidence level of the watch 251. These transmissions can occur using an encrypted communication protocol which operates on top of the Bluetooth communication system and utilizes the Bluetooth communication system. While the watch 253 is within Bluetooth radio range of the companion 255, one or more wrist state values can be transmitted by the watch 253. In one embodiment, these transmissions can occur through Bluetooth advertisements which can include an advertising identifier as well as the wrist state value determined by the watch 253 based upon data from the one or more sensors in watch 253, such as one or more sensors 206. In one embodiment, the companion device (e.g. companion device 255) can be paired with many other devices (such as Bluetooth speakers, Bluetooth earphones, Bluetooth keyboards, etc.) in addition to being paired with two watches (such as watches 251 and 253). It will be understood that the companion device is configured to perform one or more methods described herein for the two watches while the companion device does not perform these methods for the other paired devices that are not configured to switch (and synchronize) in the manner described herein.

Figure 8:
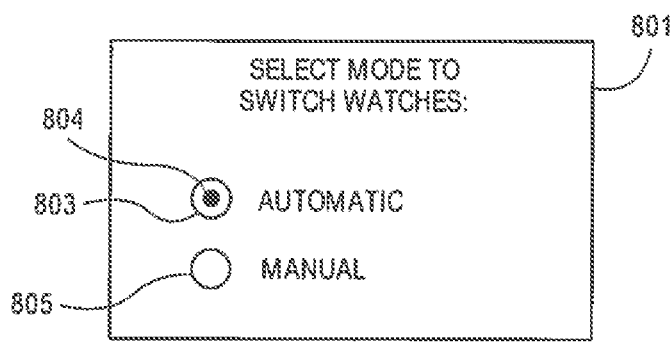
FIG. 8 shows an example of a user interface which can be displayed to a user to allow the user to select between different modes for switching between paired accessories, such as paired watches.
Figures 12, 13:
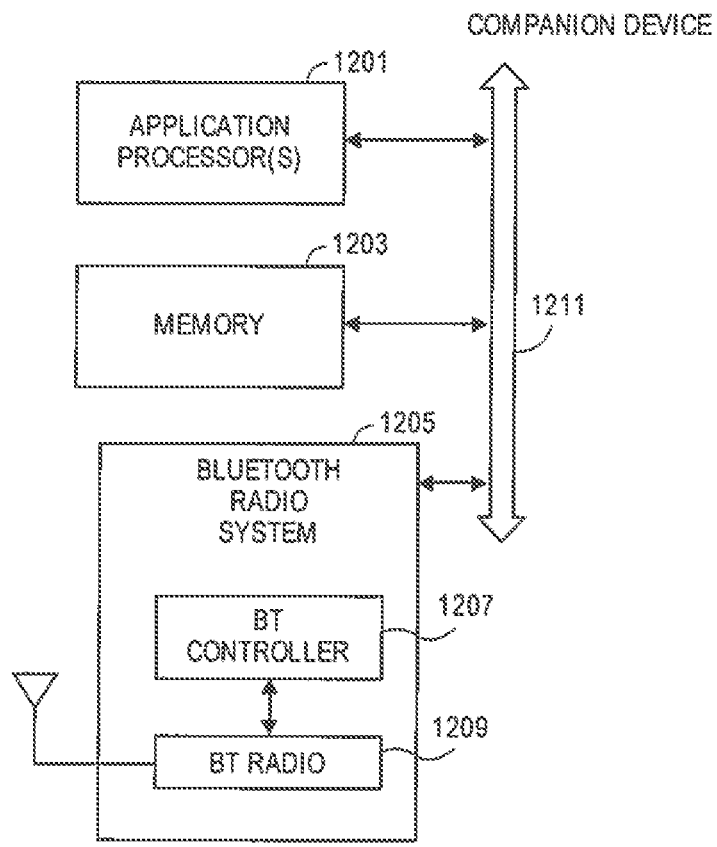
FIG. 12 shows an example of some of the components of a companion device which can be used to filter out Bluetooth advertisements according to one embodiment described herein.
FIG. 13 shows an example of how filter logic can be configured in the Bluetooth controller of FIG. 12 according to one embodiment.

FIG. 13 provides an example of wrist state values. In that example, the wrist state can have four possible values shown as zero, low, medium, and high. Zero represents a state in which the sensors provide outputs from which the watch determines that it is not on the user's wrist. The low value indicates a low on-wrist confidence level. The medium value indicates a medium on-wrist confidence level, and the high value indicates a high on-wrist confidence values. In an alternative embodiment, fewer or more values can be used to indicate on-wrist confidence levels. For example, in one embodiment, if wrist detection (such as operations 521 and 523 in FIG. 5B) is disabled on an accessory, the accessory can set its wrist state to a medium high level that is between the medium and high confidence levels. When wrist detection is disabled on the accessory, the accessory does not attempt to determine whether it is on-wrist, and the sensors described herein are not used to perform wrist detection. In one embodiment, when the accessory sets its state to medium high, the accessory prevents any elevation to the high confidence level (in order to prevent its state from being locked in the high confidence level). In one embodiment, if multiple accessories have their wrist detection disabled and are in Bluetooth radio range of the companion device, the companion device will keep active whichever one it has designated as active as long as that accessory remains in radio range and when it leaves radio range the companion device will switch to a next accessory in radio range and having the oldest medium high level. In one embodiment, a user can trigger a manual switch through a user interface on the companion device (even if the automatic option 803 in FIG. 8 is selected) if any of the paired accessories has wrist detection disabled; this would allow a user to trigger a switch if the automatic switching methods described herein fail when wrist detection is disabled. In one embodiment, manual switching is blocked when the automatic option 803 is selected and all paired watches have wrist detection enabled.

In one embodiment, a combination of data from different sensors can be used to derive the on-wrist confidence level. In one embodiment, data from an accelerometer may indicate the raising or lowering of a wrist and data from sensors to detect reflected or absorbed light from the user's skin (or other body part) on the user's wrist can be combined together to derive the different wrist states such as the four wrist states shown in FIG. 13. It will be appreciated that other types of sensors may also be used either alone or in combination. For example, a clasp detector (e.g. a detector on the watch's buckle) or detectors used to detect a pulse or heart rate can also be used.

While this description focuses on watches attached to (or removed from) wrists, in one other embodiments the phrase "wrist states" is generally meant to refer to a state of a position of an accessory (e.g., a head mounted display) relative to a body of a user of a companion device. Thus, the phrase "wrist state" can also include states that indicate a confidence level of being on head (or off head), etc.

The wrist state value can be computed in a variety of different ways based upon one or more outputs from one or more sensors such as sensors 206 in FIG. 2. In one embodiment that uses one or more sensors (e.g. an accelerometer) to detect the raising and lowering of the wrist and also uses one or more sensors to detect radiation reflected off of (or absorbed by) the wrist, such as the wrist's skin (which can be referred to as a wrist detection by a wrist detector sensor), the wrist state value can be derived as follows. This approach uses a combination of sensors that repeatedly over time produce outputs and these outputs are used to determine the wrist state value. When the accelerometer detects the raising or lowering of the wrist after the wrist detector senses the wrist's skin (or other body part such as blood) then the wrist state value is set to high. When the wrist detector senses the wrist's skin (or other part) but the accelerometer has not detected a wrist raised or lowered in a period of time (for example, the last 6 seconds), then the wrist state value is set to medium. When the accelerometer detects a wrist raise or lowering which occurred in the last period of time, such as the last 6 seconds, but the wrist detector does not sense the skin (or other body part) of the wrist, then the wrist state value is set to low. The value of zero for the wrist state is set if the accelerometer does not detect a wrist raise or lower in the last period of time, such as the last 6 seconds and the wrist detector does not sense the wrist's skin (or other body part). These wrist values can be repeatedly determined over time and will most likely change if the user removes one on-wrist watch and replaces it with another. In one embodiment, an additional wrist state value may be provided based upon a detected touch of the watch's touch screen or other detected user interaction with the watch. If this detection (e.g. of a finger on the touch screen) occurs in combination with the detections that produced the high wrist state value then the system can produce this additional wrist state value which can be characterized as extra high. It will also be appreciated that in other embodiments, "gestures" or wrist movements other than raising or lowering can be used such as shaking or twisting of the wrist, etc.

In one embodiment, the companion device, such as companion device 255 can repeatedly over time scan for wrist state values from at least inactive paired watches, in addition to receiving wrist state values from the active paired watch. In one embodiment, the companion device may not always scan for watches; for example, in one embodiment, if the wrist state value for the active watch is continually high indicating the watch has a high on-wrist confidence level, the companion device may not scan for other watches. In particular, the companion device can be configured to scan when the active watch is connected as the active watch with the medium or lower confidence level, but if the active watch is connected with higher than a medium confidence level then the companion device may be configured to not scan for multiple watches. This can help to conserve battery power on the companion device if the companion device is powered by a battery.

Figure 4:
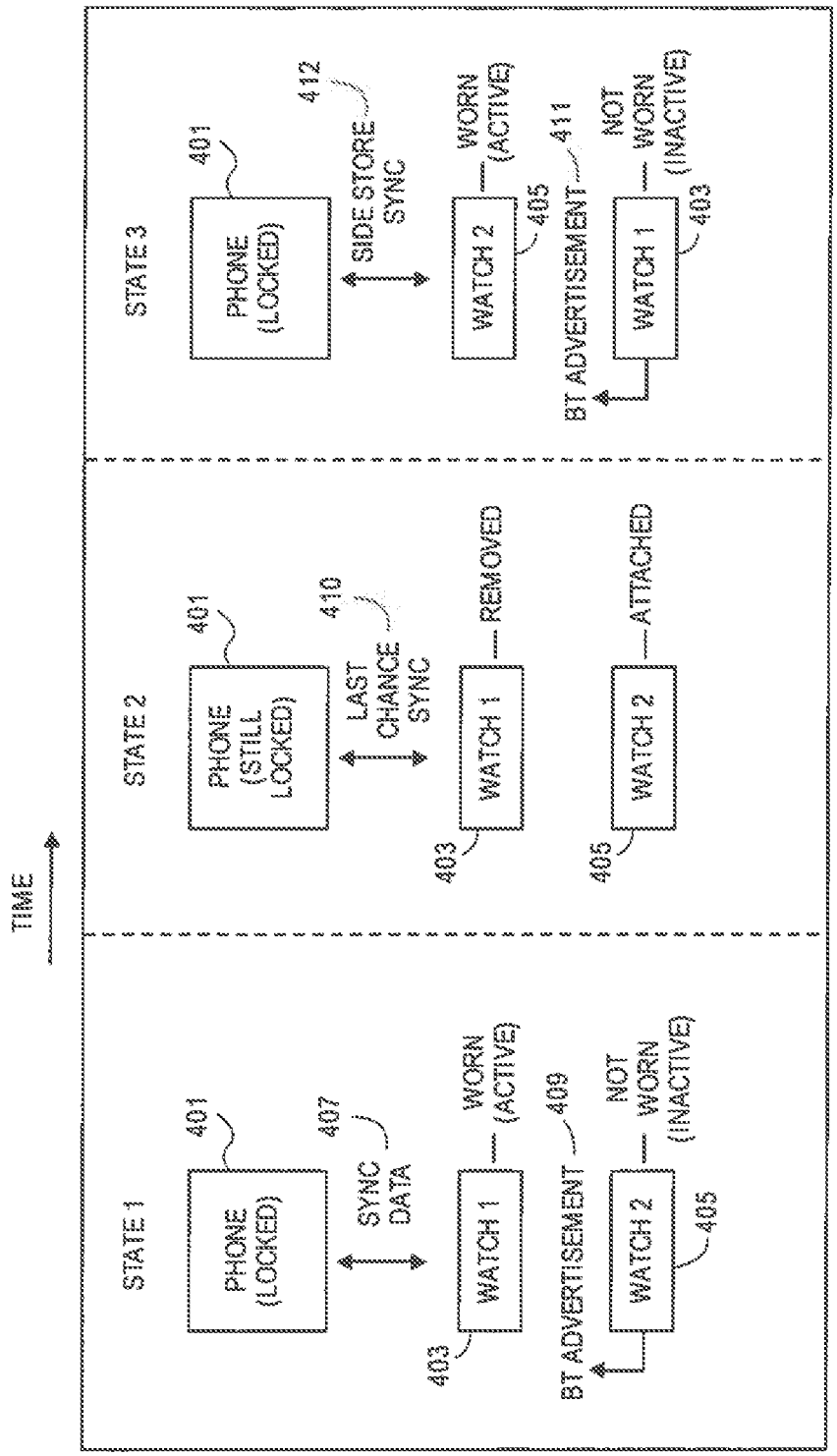
FIG. 4 is a diagram which shows different states over time as the companion device switches between watches in response to removal of one watch and attachment of another.

FIG. 4 shows a series of states which occur over time as a user switches from a first watch to a second watch using one or more of the embodiments described herein. In state 1, the companion device is a smartphone 401 which is currently in a locked state. The companion device 401 can receive wrist state values from watch 405 (the second watch) which is not being worn and therefore is inactive. These wrist state values can in one embodiment be sent through Bluetooth advertisements which are known in the art and which are shown as Bluetooth advertisements 409. These advertisements can be received by the companion device 401 when the device scans for Bluetooth advertisements from the inactive watches. The active watch, which is watch 403 (watch 1), can have an encrypted communication protocol channel set up to provide data back and forth between the watch 403 and the companion device 401. For example, synchronization data 407 may be transmitted between the devices in either direction through this channel. In one embodiment, health synchronization data can be transmitted from watch 403 to the companion device 401 as part of the synchronization data 407 even when the companion device 401 is locked. The locked state normally requires a user's security input to unlock the device to allow the device to receive further user input. When the device is locked, the device expects the user's security input and if it does not receive it, it will continue to remain in the locked state preventing the user from using the companion device (although in some embodiments certain limited actions such as making an emergency phone call or using a camera may be permitted while in the locked state). In one embodiment, the user's security input is any one of: a password; a numeric passcode; a two dimensional gesture on a touchscreen of the companion device; a biometric input such as a fingerprint, voice input from the user, retina scan of the user's eye, or an image, such as an image of the user's face. In one embodiment, the user's security input can be a combination of two or more of: a password; a numeric passcode; a gesture on a touchscreen; or a biometric input. As is known in the art, companion devices can be set up so that after a period of time of inactivity on the device, the device will automatically become locked and enter a low power state while it is locked. For example, when a smartphone is placed in a user's pocket or purse, after a period of time, the smartphone can be configured to enter the locked state and also enter reduced power state as is known in the art. It will be appreciated that embodiments described herein can also work when the companion device is unlocked even though in all instances shown in FIG. 4 the companion device remains locked throughout the different states shown in FIG. 4.

State 2 of FIG. 4 shows that the user has removed watch 1 (watch 403) and has attached watch 405 to the user's wrist. The sensors on each of the watches can determine the removal and attachment from outputs of the sensors and provide the different wrist state values to the companion device 401. In state 1, watch 403 would normally have a high on-wrist confidence level shown by its wrist state values while watch 405 would have a lower on-wrist confidence level shown by its wrist state values which are transmitted to the companion device 401. In state 2, watch 405 begins to transmit higher on-wrist confidence levels than watch 403. After a short period of time, the companion device 401 can determine from the change in on-wrist confidence levels that watch 405 has been attached and watch 403 has been removed. In response, the companion device 401 can begin the operation of switching the watches automatically without requiring any user input other than physically removing one watch and attaching the other. In one embodiment, prior to initiating the switch or concurrently with initiating the switch, the companion device 401 provides a last chance opportunity for watch 403 to provide synchronization data from the watch 403 to the companion device. In one embodiment, this data can include health data not previously transmitted to the companion device 401 so that the companion device 401 can store the latest available health data from watch 403 which can then be made available to the new active watch which in this case is watch 405. One way in which this new data (e.g. latest or near latest available health data) can be made available to the watch 405 is through the synchronization with the side store process 412 shown in state 3 and which is described further below. The roles of the watches have now been changed (in state 3) and now watch 403 begins to transmit its wrist state values through Bluetooth advertisements 411 and the companion device 401 can receive those advertisements when it scans for Bluetooth advertisements.

This switch between watches can occur, in one embodiment, while the companion device is locked and in a sleep state (e.g. the touchscreen display is off) and while both watches are locked and in a sleep state. This switch between watches causes the two watches to operate differently. The inactive watch can become locked and stop collecting health data and enter a sleep state and no longer provide accessory functionality (e.g. notifications) after the switch (or during the switch). The active watch can now use the established (encrypted) communication channel to provide accessory functionality such as notifications to the user and collect and transmit health data to the companion device. Moreover, apps on the new active watch can be used by the user (while apps on the inactive watch will not be used by the user).

Figures 5A, 6:
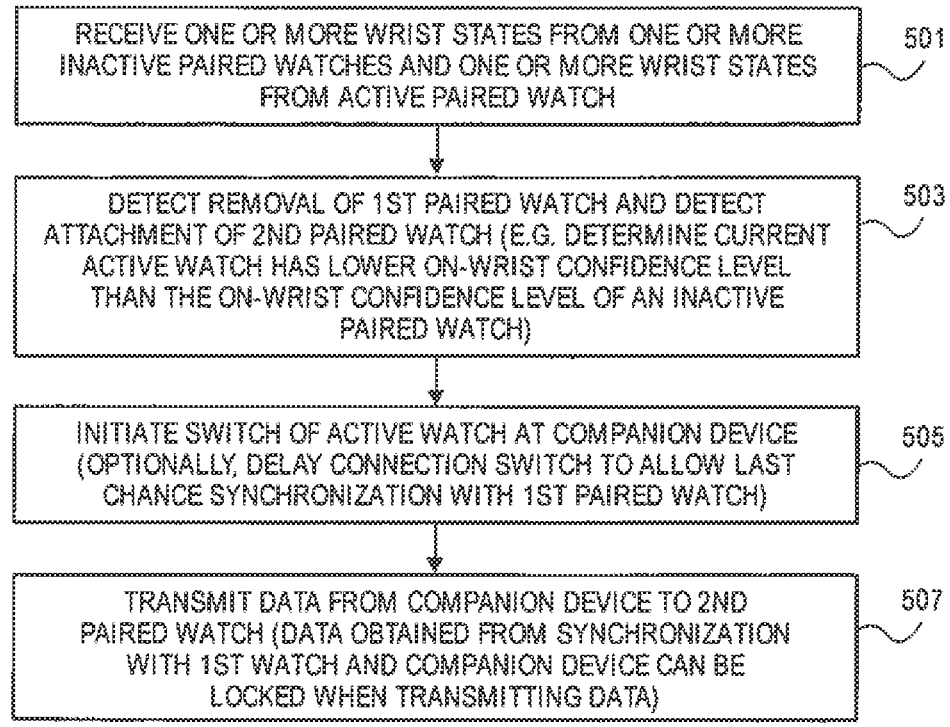
FIG. 5A is a flowchart which illustrates a method which can be performed by a companion device according to one or more embodiments described herein.
FIG. 6 is a truth table which can be used to implement the switching logic performed by a companion device according to one or more embodiments described herein.

FIG. 5A shows a method which can be performed by a companion device according to one or more embodiments described herein. This companion device can be a companion device 12 or 225 or 401 which can also perform the methods shown in FIGS. 7 and 9 in one embodiment. As shown in operation 501, the companion device can receive one or more wrist states from one or more inactive paired watches and also receive one or more wrist states from the active paired watch. The transmissions from the inactive paired watches may be Bluetooth advertisements which include one or more wrist state values in the payload of those advertisements, and the wrist state values from the active paired watch may be provided through an encrypted communication protocol implemented on top of the Bluetooth connection. Concurrently with receiving the wrist states from the active paired watch, the companion device may also receive health data or other data from the active paired watch, and this data can be stored in one or more synchronization databases as is described further below. During operation 501, the active paired watch and the companion device can operate as is known in the art. For example, phone calls may be received in the companion device if the companion device is a smartphone and the watch can provide notifications of emails, voicemails, text messages, and other prompts to the user. In addition, those devices can receive user inputs through, for example a touchscreen or the user's voice to cause each device to perform operations based upon the executing programs in each of the devices. In one embodiment, it is assumed that the currently active paired watch is periodically providing data for purposes of synchronization, and particularly for purposes of synchronizing health data for use by currently inactive watches which could become active at some point in the future.

In operation 503, the companion device determines that the first paired watch has been removed and determines that the second paired watch has been attached to the user's wrist. In one embodiment, this can be determined by comparing the on-wrist confidence levels of the two watches, where each on-wrist confidence level is based on the most recent wrist state values received from each watch by the companion device. A companion device may be configured (for example by software) to implement the truth table shown in FIG. 6. The table 601 shown in FIG. 6 has entries 603, 605, 607, 609, 611, and 613 which indicate whether or not to switch between the watches depending upon on-wrist confidence levels received from the watches. The entries 603 and 609 are situations where the wrist state values are identical and a tie has occurred for the two watches. In addition, the truth table 601 also takes into account whether or not the current active watch ("selected watch") is within range of the companion device.

In one alternative embodiment, a watch may be configured to temporarily spoof its wrist state value if it is in active communication which is part of a synchronization process or some other process. In particular, the active paired watch may be configured to send to the companion device a high wrist state value for a predetermined short period of time (even if it has detected removal and its true wrist state value is medium or low or zero) if the active paired watch is in the process of active synchronization or other designated process which is provided the privilege of additional time to complete the communication prior to switching to the currently active paired watch to an inactive status.

Figure 7:
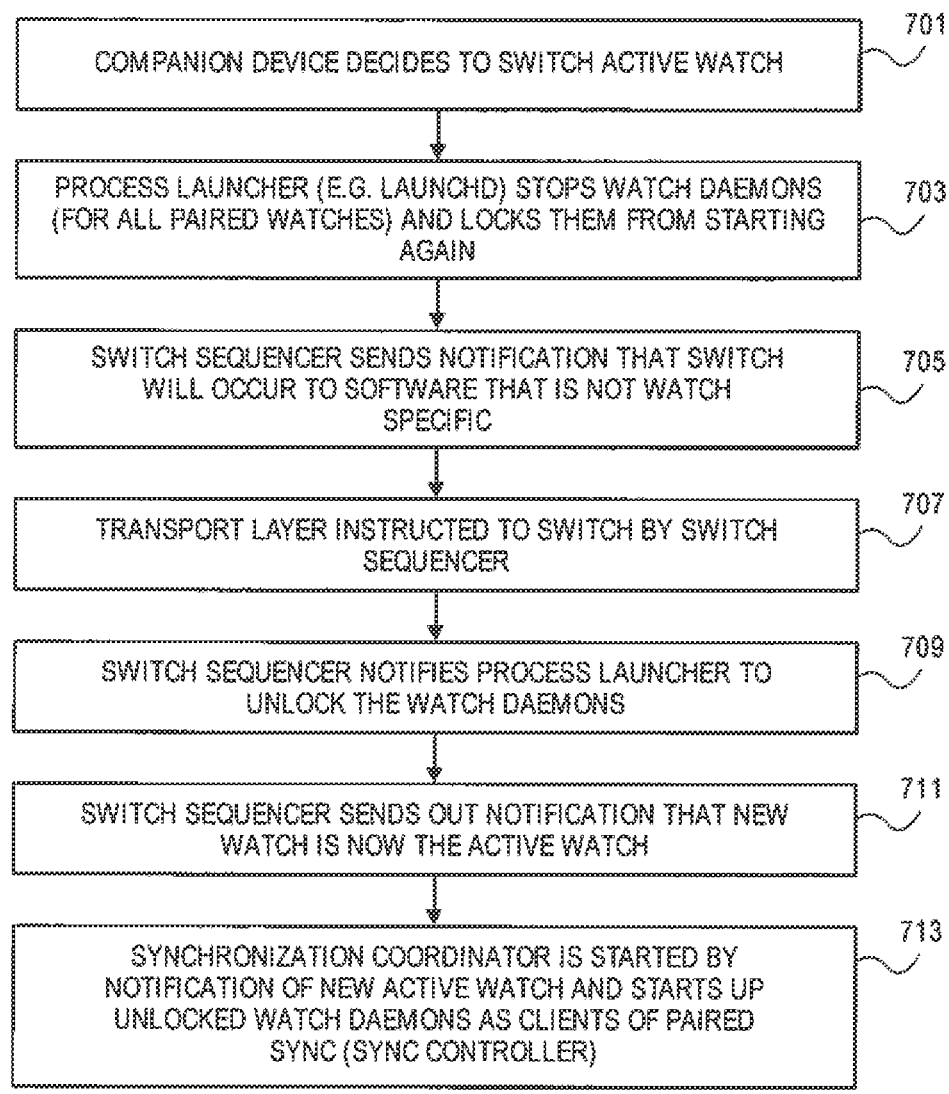
FIG. 7 is a flowchart which illustrates a method which can be performed by a companion device according to one or more embodiments described herein for switching between paired accessories, such as paired watches.

In operation 505, the companion device initiates the switch of the active watch. In one embodiment, the companion device can delay the connection switch to allow a last chance synchronization of health data or other data with the first paired watch. FIG. 7 provides an example of a particular embodiment in which the switch is performed by a set of software components on the companion device.

In operation 507, the companion device can then transmit data to the new active paired watch, and this data can include data obtained from the synchronization with the first watch, such as health data transmitted during the last chance synchronization (e.g., last chance synchronization 410 shown in FIG. 4). The transmission of this data in operation 507 can in one embodiment be performed even when the companion device is locked so that the newly active paired watch can receive all of the most recent data from the prior active watch, including health data while the companion device remains locked. Moreover, in one embodiment, the second paired watch (the newly active paired watch) in operation 507 can receive the transmitted data while that watch is also in a locked state, which is similar to the locked state of the companion device in that the user's security input is required on the watch to unlock the watch.

Figure 5B:
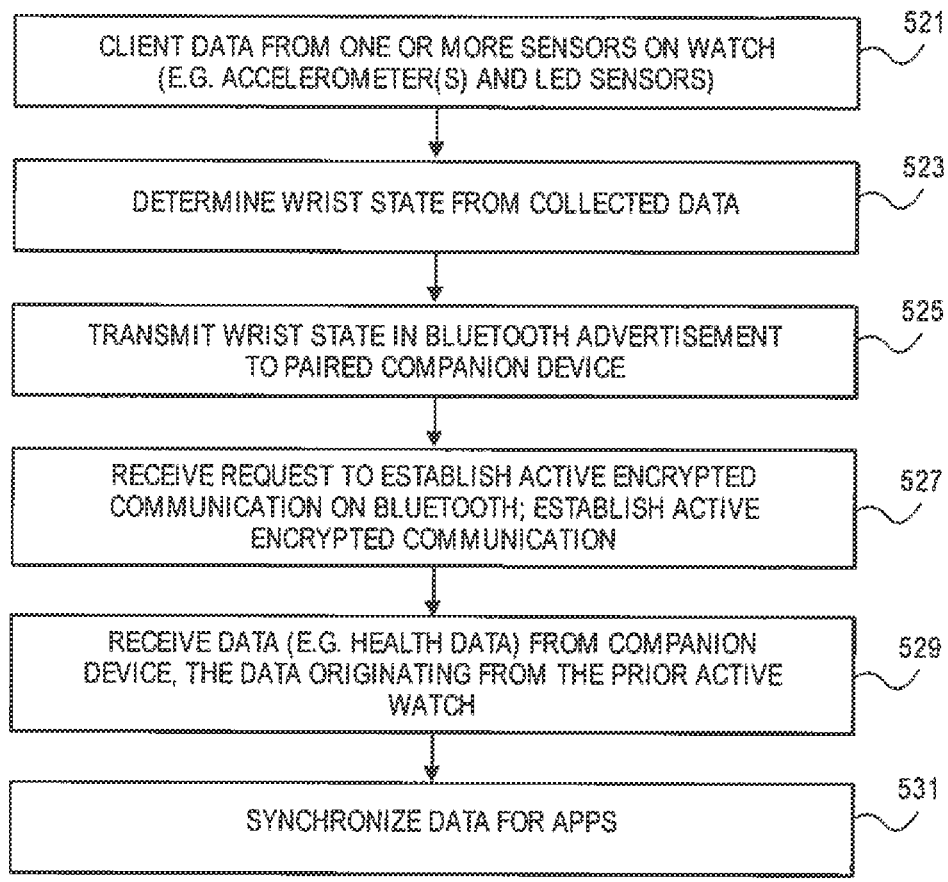
FIG. 5B is a flowchart which illustrates a method which can be performed by an accessory, such as a paired watch, according to one or more embodiments described herein.

FIG. 5B shows a method which can be performed by a paired watch which is initially an inactive watch and then becomes the active watch after a switch. Thus, the method shown in Figure 5B can be performed by the watch 405 shown in FIG. 4. In operation 521, the inactive watch can collect data from one or more sensors on the watch such as one or more accelerometers and one or more LED sensors which sense radiation reflected from the wrist's skin (or other body part). Then in operation 523, the watch determines the wrist state from the data collected from the sensors, and then transmits that wrist state in operation 525 in one or more Bluetooth advertisements to the watch's paired companion device. The Bluetooth advertisements can include the wrist state as a payload in the Bluetooth advertisement and the Bluetooth advertisement can have a rotating advertising identifier which is shared with all of the paired watches which have been paired with the companion device. The rotating of the advertising identifier is a process known in the art and each of the watches and the companion device are configured to rotate through the advertising identifiers in a known sequence with predetermined times at which the identifiers change.

At some point between operation 525 and operation 527 the companion device decides that the user has removed the active watch and replaced it with the inactive watch. For example, the companion device performs operation 503 between operations 525 and 527. In turn, the companion device transmits a request which is received by the watch in operation 527, and this is a request to establish active encrypted communication on Bluetooth with the companion device. After operation 527 establishes an active encrypted communication channel with the new active paired watch, then the watch can receive data in operation 529 from the companion device where the data originated from the prior active watch. For example, this data can include health data or other data provided during synchronization including, for example, the last chance synchronization such as last chance synchronization 410 shown in FIG. 4. In one embodiment, after operation 529, data for applications other than a health application can be synchronized in operation 531, and further details about the synchronization are provided in connection with operation 713 of FIG. 7. It will be understood that the word "app" is an abbreviation of application which is a form of a software program.

Referring now to FIG. 7, the companion device can implement a specific method using various software components on the companion device to cause the switch to occur. This method can begin in operation 701 in which the companion device decides to switch the active watch. This can be similar to the operation 503 of FIG. 5A. In response to this decision a launcher process can stop all watch daemons for all paired watches and lock them from starting again. In one embodiment, the process launcher can be the software component known as launched which is in the OS X and iOS operating systems from Apple Inc. of Cupertino, Calif. A switch sequencer software component in operation 705 can then send a notification that a switch will occur to software that is not watch specific. Then in operation 707 a transport layer is instructed to switch by the switch sequencer, and in operation 709, the switch sequencer notifies the process launcher to unlock the watch daemons after an encrypted communication channel has been established with the new active watch and the prior encrypted communication channel with the prior active watch has been torn down. Then in operation 711, the switch sequencer sends out notifications that the new watch is now the active watch. A synchronization coordinator in operation 713 receives that notification and then can start up the unlocked watch daemons as clients of a synchronization controller such as a paired sync software component that can control when and how, in an ordered sequence, a series of apps are allowed to synchronize their data between the companion device and the new active paired watch. By using a sync controller to control synchronization, the synchronization process can be managed so that there is an orderly process that prevents every app from attempting to synchronize immediately, thereby affecting the usability of the watch or the companion device.

Figure 9:
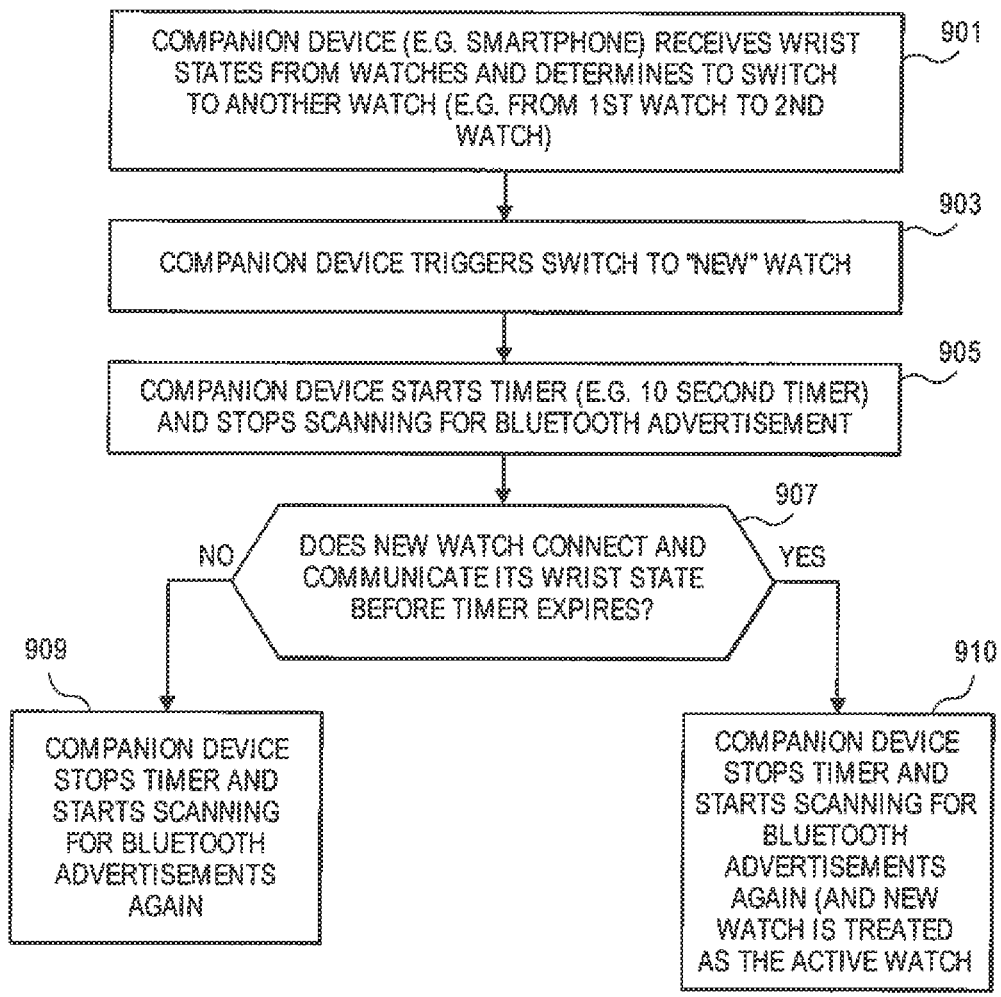
FIG. 9 is a flowchart which illustrates a method which can be performed by a companion device during the switch between paired accessories such as paired watches.

FIG. 9 shows a method according to one embodiment which attempts to prevent a race condition between two watches which could cause the companion device to switch quickly and repeatedly between two watches. The method shown in FIG. 9 can be performed in conjunction with the method shown in FIG. 5A. In operation 901, the companion device receives one or more wrist states from watches and determines, based on those wrist states, to switch to another watch, such as a switch from a first watch to a second watch. In one embodiment, the wrist states can be included in Bluetooth advertisements from the watches. In operation 903, the companion device triggers the switch to the new watch, and in operation 905, the companion device starts a timer, when it triggers the switch and stops scanning for Bluetooth advertisements. In one embodiment, the timer can count down from 10 seconds such that it becomes a 10 second timer which expires after 10 seconds from starting. Then in operation 907, the companion device determines whether the new watch has successfully connected and has communicated its wrist state before the timer expires. If the companion device determines from operation 907 that the new watch has not successfully connected and communicated its wrist state before the expiration of the timer, then the companion device performs operation 909 in which it stops the timer and starts scanning again for Bluetooth advertisements. Operation 909, in one embodiment, assumes that the new watch has been disconnected or is not on-wrist but it will be still treated as the active watch for purposes of future processes in which the companion device attempts to determine which watch is active. If operation 907 determines that the new watch has connected successfully and has communicated its wrist state before the timer expired then operation 910 follows in which the companion device stops the timer and starts scanning for Bluetooth advertisements again but in this case the new watch is treated as the active watch. Both of operations 909 and 910 can cause the companion device to repeat back to operation 901 to continue a process to monitor the watches.

While the companion device performs the methods described herein (such as those methods shown in Figures 5A, 7 and 9), an accessory can operate with different levels of advertising (such as aggressive levels which are more frequent than non-aggressive levels), and switching between these different levels over time on the accessory can conserve power on the accessory. For example, in one embodiment, an accessory can advertise aggressively only when its application processor (such as one of the processors 203 that execute user applications that display content on the touch screen display 205) is awake and can advertise non-aggressively when its application processor is asleep; in one embodiment the non-aggressive advertising can be further limited to occur only when its application processor is asleep and the accessory has information that indicates the companion device is paired with multiple switching accessories (in a group of accessories that perform automatic switching and synchronization as a result of the automatic switching). This information about paired accessories is normally maintained on the companion device and can be transmitted to each paired accessory when the accessory becomes the active accessory; the accessory can use this information to determine whether to non-aggressively advertise when its application is asleep. If the accessory determines that the information indicates that the accessory is one of multiple switching accessories (that are grouped in a group of accessories that can switch between themselves and synchronize data among them through the companion device) and determines that its application processor is asleep then the accessory can non-aggressively advertise for a period of time such as a predetermined period (e.g. at least 5 minutes but less than 8 minutes). In one embodiment, an accessory such as a watch can cycle through aggressive and non-aggressive advertising by beginning with aggressive advertising in response to the application processor (AP) becoming awake (e.g. in response to a wrist raise movement that is sensed by sensors on the accessory which cause the AP to awake from a sleep, low power state) and then transiting to non-aggressive advertising in response to the earlier to occur of: the AP goes back to a sleep state or a period of time (such as a predetermined period of 4 seconds) has elapsed since the accessory began aggressively advertising, and then the accessory can continue non-aggressively advertising for a period of time and stop after the period of time (or transition to aggressive advertising if the AP awakes from a sleep state). The times used in the timers can be varied to achieve desired results. For example, shorter times which limit power consumed can be balanced against a desire to detect switches when they occur (for an improved user experience), and shorter times also improve user privacy as it becomes harder for an attacker to track a user.

In one embodiment, a companion device and its set of paired watches can perform the methods described herein for switching between the watches without any user input or user action other than the user physically removing one watch and attaching another while both watches are within Bluetooth radio range (or range of other wireless communication system) of the companion device. In other words, the process can be automatically performed by the set of devices without an explicit input from the user that a switch of watches is supposed to occur. Moreover, the switch can occur while the companion device is locked and while one or both of the paired watches are locked. In an alternative embodiment, the companion device may allow the user to select between either automatic switching of watches or manual switching of watches. This selection may be provided to the user through a graphical user interface which is displayed on a touchscreen of the companion device or a touchscreen of a paired watch which is active or both. FIG. 8 shows an example of a graphical user interface 801 which can be displayed on a touchscreen of a companion device or watch. The user interface can include mutually exclusive options automatic 803 and manual 805. The user can select one of the two options or modes by, for example, touching one of the two options such as option 803 for automatic (which can use the methods shown in FIGS. 5A and 5B) or option 805 for manual. In the example shown in FIG. 8, the user or the system has selected option 803 as shown by the dot 804 within the circle of option 803. If the user touches the manual option 805, then the dot would appear in the circle for manual 805 and would not appear in the circle for automatic option 803. If the user selects manual operation, then a separate user interface can be provided to allow the user to initiate and complete a switch between watches (rather than an automatic process performed by watches and a companion device without requiring user input).

In one embodiment, when automatic option 803 is selected the companion device can scan for accessories and perform the methods shown in FIGS. 5A, 7 and 9. When the manual option 805 is selected the companion device can stop scanning for accessories although the accessories can continue to advertise their identifiers so that a user can manually switch between the accessories.

Figure 10:
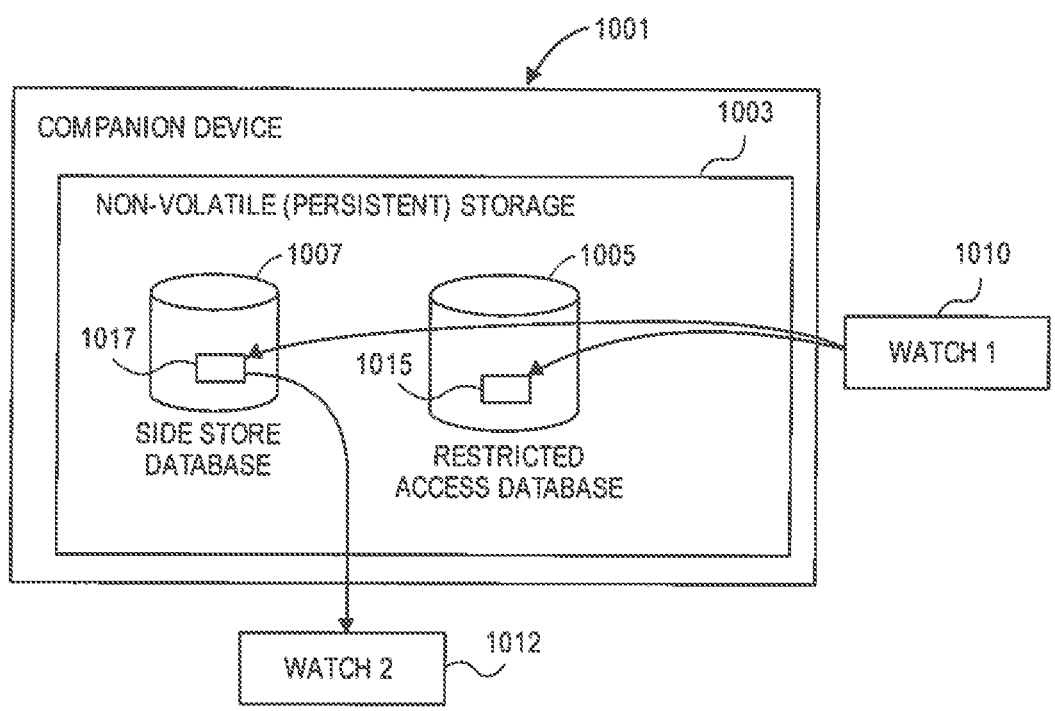
FIG. 10 shows an example of how a companion device can perform one or more methods for storing synchronization data from a first watch and using that stored data to synchronize with the second watch even if the companion device and the second watch are both locked.
Figure 11:
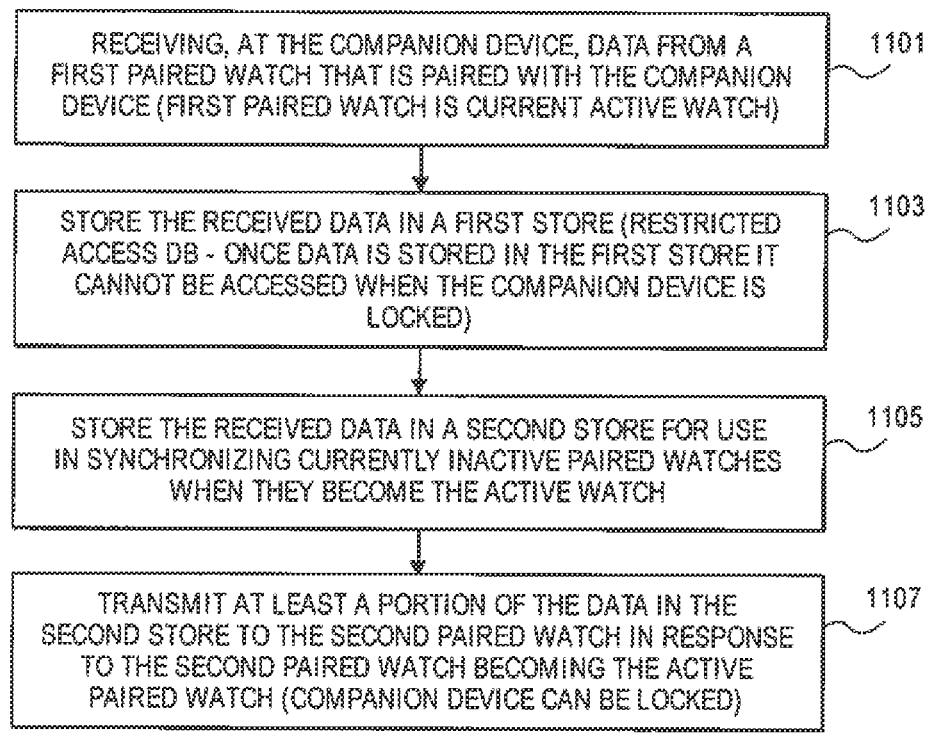
FIG. 11 shows a flowchart that illustrates a method performed by a companion device according to one or more embodiments relating to FIG. 10.

FIGS. 10 and 11 show another aspect of the embodiments described herein in which a side store database is used to synchronize a new active watch with data, such as health data, from a prior active watch. In one embodiment, this synchronization can occur even if a companion device is locked during the switch between the watches. FIG. 10 shows a portion of a companion device 1001, and in particular shows the non-volatile (persistent) storage 1003 of the companion device 1001. In one embodiment, the non-volatile storage 1003 can be flash memory of a smartphone which stores the operating system and platform applications and data of the smartphone. The storage 1003 can also store two separate databases for use with one or more embodiments described herein. In particular, database 1005 is a restricted access database storing sensitive data, such as health data of the user. The health data can be generated by each of the user's watches and provided to the database 1005 during synchronization operations, such as the synchronization communication 407 shown in FIG. 4. In addition, the last chance synchronization, such as last chance synchronization 410 shown in FIG. 4 can also result in the storage of health data in the database 1005. Once data is stored in the database 1005, the data cannot be accessed when the companion device is locked. This can be achieved by discarding the keys stored in DRAM, which keys are used to decrypt the data stored in database 1005. A database 1007 can also be used and stored on storage 1003. This database 1007 represents a side store database containing data which can be used to synchronize inactive watches in the future when those inactive watches become the active watch. In one embodiment, the database 1007 can be used by a transport layer software component that establishes the encrypted communication protocol over Bluetooth between the active paired watch and the companion device.

FIG. 11 shows an example of a method which can be performed with the companion device 1001 and the watches 1010 and 1012 shown in FIG. 10. In operation 1101, the companion device can receive data from a first paired watch, such as watch 1010 that is paired with the companion device, such as companion device 1001, where the first paired watch is the current active watch. Thus, watch 1010 is initially the current active watch and provides data from that watch for purposes of synchronization with the companion device and with inactive watches which may become active in the future. The received data can be stored in operation 1103 in a first store which can be a restricted access database, such as the database 1005. In the example shown in FIG. 10, the received data stored in operation 1103 can be data 1015 stored in the database 1005. Once data 1015 is stored in database 1005, it cannot be accessed while the companion device is locked. In one embodiment, data 1015 can be stored in the database 1005 while the companion device is locked while in another embodiment it can remain in DRAM in an encrypted state. At or around the same time that the data 1015 is stored in the database 1005, data 1017 is stored in the side store database 1007 for use in synchronizing currently inactive watches which may become the active watch in the future, such as watch 1012. This is shown as operation 1105 in FIG. 11 in which the received data is stored in a second store, which in this case is database 1007 for use in synchronizing currently inactive paired watches once they become the active watch. In one embodiment, data 1017 can be encrypted with a public key of each of the inactive watches, and this encrypted data can be decrypted by the inactive watch using the private key of the inactive watch, such as watch 1012. In this case an asymmetric cryptographic key system can be used such as the well known public key/private key encryption and decryption methods. In an alternative embodiment the data 1017 can be encrypted with a symmetric key and the symmetric key is encrypted with the public key of each of the inactive watches; in this alternative embodiment, the data 1017 includes both the encrypted symmetric key (which was encrypted with the inactive watch's public key) and the encrypted data (e.g. health data from active watch which was encrypted with the symmetric key) while the data 1015 does not need to include the encrypted symmetric key (which was encrypted with the inactive watch's public key). If there are multiple inactive watches, then the data 1017 in the side store will include the encrypted data (encrypted by the symmetric key) and the encrypted symmetric key for each inactive watch. In one embodiment, the storage of data 1017 in the database 1007 can occur while the companion device is locked, and this database provides a mechanism to provide updated synchronization information, such as updated health information or health data to watch 1012 after it becomes the active paired watch. This is shown in operation 1107 in which at least a portion of the data in the second store, such as data 1017 is transmitted to the second paired watch in response to the second paired watch becoming the active paired watch, and this transmission can be performed while the companion device remains locked and even while the second paired watch is locked. This is also shown in FIG. 4 in which the side store synchronization 412 is performed for watch 405 which has become the active watch.

In one embodiment, the new active watch can decrypt the portion of the data that it received from the side store in response to unlocking the newly made active watch, such as watch 1012. In one embodiment, the new active watch uses its private key (which is paired with the public key used to encrypt the symmetric key) to obtain the symmetric key and then can decrypt the data using the symmetric key. It will be appreciated that watches 1010 and 1012 can be similar to watches 403 and 405 and they progress through the states shown in FIG. 4. Thus, watches 1010 and 1012 can transmit their wrist state values which can cause the companion device 1001 to decide to switch from watch 1010 as the active watch to watch 1012 as the next active watch. In one embodiment, the data 1017, which can include health data, may not include synchronization anchors while the data in database 1005 does include synchronization anchors which can be used in the synchronization processes that are known in the art. In this case, when the companion device becomes unlocked from the locked state, the data in the database 1007 which represents a side store for future synchronizations with inactive watches can be updated with the synchronization anchors from database 1005 so that they can be used for synchronizing inactive watches in the future. The companion device can be unlocked by receiving the user's security input as has been described herein.

Another aspect of the embodiments described herein is shown in FIGS. 12 and 13. In this aspect, a companion device shown in FIG. 12 can implement a filter using hardware or a combination of hardware and software to provide a filter logic that filters out messages from the watches; such as the wrist state values and the advertising identifier values contained in the radio signals. This filtering out process can prevent one or more application processors from waking up from a sleep state which can conserve battery power. Additionally, the one or more application processors may enter a sleep state when the companion device is locked and these one or more application processors can be the main processors of the companion device and can execute the operating system software and the user applications that present content to the user and receive user inputs through a touchscreen input of the companion device. The companion device shown in FIG. 12 can be the companion device 401 or the companion device 255; further, the companion device shown in FIG. 12 can perform the method shown in FIG. 5 as well as the methods shown in FIGS. 7 and 9 to allow for automatic and seamless switching between a set of paired watches or other paired accessories. Moreover, the companion device shown in FIG. 12 can use the method of FIG. 11 in conjunction with the storage architecture shown in FIG. 10 to allow for the use of a side store to provide for side store synchronization, such as side store synchronization 412 shown in FIG. 4. It will be appreciated that the companion device shown in FIG. 12 is shown with only some of its components in a typical implementation. In particular, one or more application processors 1201 is coupled to memory 1203 through one or more buses 1211. In addition, a Bluetooth radio system 1205 is coupled to the remainder of the system through one or more buses 1211. In addition, the companion device shown in FIG. 12 can also include a WiFi transceiver, and a cellular telephone transceiver, as well as a display which has an integrated touchscreen on the display as is common with smartphones. It will be appreciated that memory 1203 can include one or more memories known in the art including DRAM memory, ROM memory, and flash memory or other non-volatile (persistent) storage.

The Bluetooth radio system 1205 can include a Bluetooth radio transceiver 1209 and a Bluetooth controller 1207 which is coupled to the Bluetooth transceiver 1209. The Bluetooth controller 1207 is in turn coupled through one or more buses 1211 to the one or more application processors 1201 and to memory 1203. The application processors 1201 can provide data to the Bluetooth controller 1207, such as values representing wrist states for processing by filter logic which can be implemented within the Bluetooth controller 1207. For example, the application processors can provide, in one embodiment, the last wrist state value from the active watch that was received by the one or more application processors; this last wrist state value can be provided to the Bluetooth controller 1207 before the application processors enter a sleep state.

The Bluetooth transceiver 1209 can be configured to receive one or more wrist states from an active paired watch and one or more wrist states from one or more inactive paired watches and provide these wrist states to the Bluetooth controller 1207. The Bluetooth controller 1207 can be configured, through the filter logic to prevent waking up of the one or more processors 1201 from one or more sleep states when all of the one or more inactive paired watches have a wrist state that indicates a lower on-wrist confidence level than a most recent wrist state from the active paired watch. This most recent wrist state of the active watch can be the last wrist state value of the active watch that was provided by the application processor(s) to the Bluetooth controller 1207 before the application processor(s) enter a sleep state. In this way, the filter logic filters out wrist states which indicate that the current active paired watch has remained the active watch as it has continued to have the highest on-wrist confidence level relative to all other watches which have sent wrist state values. The Bluetooth controller 1207 is also configured, through the filter logic, to wake up the one or more application processors 1201 from a sleep state when anyone of the one or more inactive paired watches has a wrist state that indicates a higher on-wrist confidence level than the most recent wrist state from the active paired watch. This allows the one or more application processors to remain in a sleep state, which is a reduced power consumption mode relative to a run state of those processors while the Bluetooth radio system continues to scan for any possible switches of the paired watches. In addition, the Bluetooth controller 1207 also filters out advertisements from watches that do not have the same advertising identifier so that the application processor is not woken up for watches that are not paired with the companion device. This can be implemented by having the companion device and the watches that are paired with the companion device share the same advertising identifier so that the companion device can filter out advertising identifiers contained in the Bluetooth advertisements which do not match the shared advertising identifier. As noted above, this advertising identifier can be rotated over time through a known sequence of values at predetermined times known to the companion device and all of its paired watches. In one embodiment, the watches are paired with the companion device through a conventional Bluetooth pairing process.

FIG. 13 shows an example of the filter logic which can be used to filter out all of the situations in which the current active watch continues to have the highest on-wrist confidence level. In one embodiment, the filter logic can be configured to receive a binary payload contained within the Bluetooth advertisement. As is known in the art, the Bluetooth advertisement can include an advertising identifier as well. The binary payload represents one of the possible wrist state values that can be received by the Bluetooth radio 1209 and processed by the Bluetooth controller 1207. In particular in this embodiment, the binary payload which is 00000000 is assigned a wrist state value of zero while the binary value of 00000011 is assigned a wrist state value of low and the binary value of 00001111 is assigned a wrist state value of medium, and the binary value 0011111 is assigned the wrist state value of high. The unused binary values can be used in future implementations in which additional wrist state values may be used (such as the extra high wrist state value described herein or a medium high level that can be used in one embodiment only when wrist detect on the companion device is set to off). If the current active paired watch has a wrist state of medium (shown by reference 1249) then the Bluetooth controller 1207 can be configured with filter logic to require a 1 in column 1250 of the binary payload as shown in FIG. 13. In this way, the filter logic in the Bluetooth controller will only assert an interrupt to wake up the one or more processors 201 when a 1 appears within the column 1250 in a state where the current active watch has a wrist state of medium (assuming the Bluetooth advertisement also includes the proper advertising identifier which in one embodiment is shared with all paired watches in the companion device). If the Bluetooth controller 1207 causes the interrupt to be generated to wake up the application processors 1201, then the one or more application processors do wake up to cause a switch to occur as described herein.

The various embodiments described herein can be implemented in an architecture in which only one watch is permitted to be the active watch. In an alternative embodiment, the various methods and systems described herein can be used in an architecture which permits multiple active paired watches. The various embodiments described herein can alternatively use wireless communication systems that are different than Bluetooth (such as WiFi or Zig Bee).

In the embodiments described above, the new active watch is synchronized with data, such as health data that originated from the prior active watch, that is provided from the companion device (such as the side store on the companion device). In an alternative embodiment, this data can be provided to the new active watch from a different source, such as a server coupled to a network or directly from the prior active watch.

Figure 14:
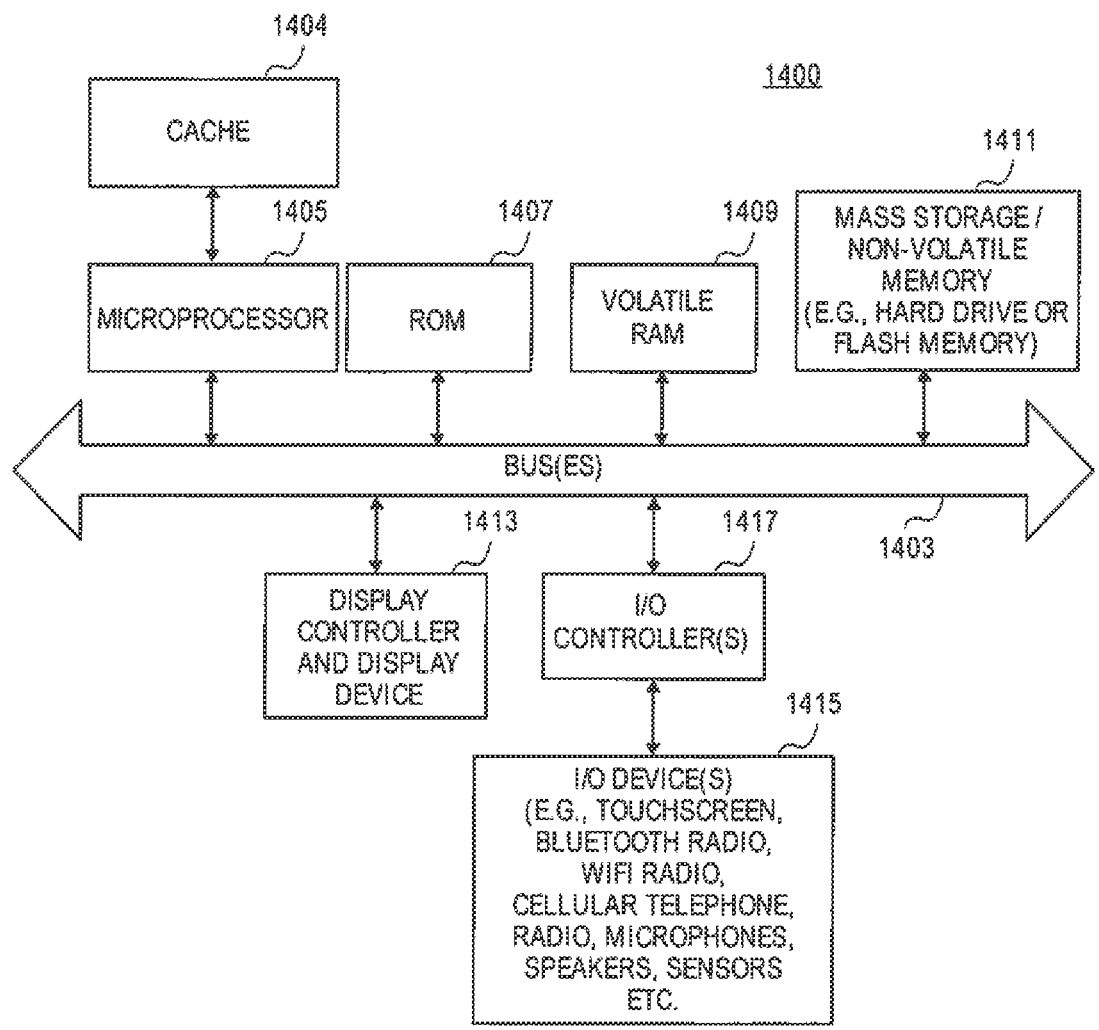
FIG. 14 is a block diagram of an example of a data processing system that can be used to implement or perform one or more embodiments described herein.

FIG. 14 shows one example of a data processing system, which may be used with any one of the embodiments described herein. Note that while FIG. 14 illustrates various components of a data processing system such as a companion device or a paired accessory, it is not intended to represent any particular architecture or manner of interconnecting the components as such details are not germane to this description. It will also be appreciated that consumer electronic devices and other data processing systems which have fewer components or perhaps more components may also be used with one or more embodiments described herein.

As shown in FIG. 14, the computer system 1400, which is a form of a data processing system, includes a bus 1403 which is coupled to one or more microprocessor(s) 1405 and a ROM (Read Only Memory) 1407 and volatile RAM 1409 (e.g. DRAM) and a non-volatile memory 1411. The one or more microprocessors 1405 are coupled to optional cache 1404. The one or more microprocessors 1405 may retrieve stored computer programs instructions from one or more of the non-transitory memories 1407, 1409 and 1411 and execute the instructions to perform operations described above. These memories represent examples of machine readable non-transitory storage media that can store or contain computer program instructions which when executed cause a data processing system to perform the one or more methods described herein. The bus 1403 interconnects these various components together and also interconnects these components 1405, 1409 and 1411 to a display controller and display device 1413 and to peripheral devices such as input/output (I/O) devices 1415 which may be one or more of sensors (such as the sensors 206), mice, touch screens, touch pads, touch sensitive input devices, keyboards, dedicated keys (e.g. buttons for volume or mute or home, etc.) modems, network interfaces, Bluetooth radio systems, printers and other devices which are well known in the art. Typically, the input/output devices 1415 are coupled to the system through input/output controllers 1417 as is known in the art. The volatile RAM (Random Access Memory) 1409 is typically implemented as dynamic RAM (DRAM) which requires power continually in order to refresh or maintain the data in the memory.

The mass storage 1411 is typically a magnetic hard drive or a magnetic optical drive or an optical drive or a DVD RAM or a flash memory or other types of memory system which maintain data (e.g., large amounts of data) even after power is removed from the system. Typically the mass storage 1411 will also be a random access memory although this is not required. While FIG. 14 shows that the mass storage 1411 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 1403 may include one or more buses connected to each other through various bridges, controllers and/or adapters as is well known in the art.

The present disclosure recognizes that the use of personal information data (such as health data collected by one or more watches), in the present technology, can be used to the benefit of users. For example, the personal information data can be used to deliver health related information or targeted content that is of greater interest to the user. Accordingly, use of such personal information data can enable calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health information or advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information. In yet another example, users can select not to provide pertinent health information such as weight, personal characteristics, traits, etc.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
   detecting removal of a first watch which has been synchronized at least partially with a companion device and detecting attachment of a second watch, each of the first watch and the second watch having been paired with the companion device;
   transmitting data to the second watch to synchronize the second watch in response to detecting attachment of the second watch and removal of the first watch, the transmitted data providing data from the first watch.

2. The medium of claim 1 wherein detecting removal comprises receiving a first wrist state from the first watch and wherein detecting attachment comprises receiving a second wrist state from the second watch and wherein the second wrist state indicates a higher on-wrist confidence level than the first wrist state and wherein the companion device transmits the data to the second watch to synchronize the second watch with the companion device.

3. The medium as in claim 2 wherein the transmitting is performed while the companion device is locked.

4. The medium as in claim 3 wherein the companion device is locked when it requires a user's security input to unlock it to allow the companion device to receive further user input.

5. The medium as in claim 4 wherein the detecting removal and the detecting attachment is performed while the companion device is locked, and wherein the user's security input is one of or a combination of two or more of: a password; a numeric passcode; a 2-D gesture on a touch screen; a biometric input.

6. The medium as in claim 4 wherein the second wrist state is received through a Bluetooth advertisement which includes an advertising identifier.

7. The medium as in claim 6 wherein the wrist state from each watch is derived from one or more sensors on each watch and wherein the companion device is one of a smartphone or a tablet computer which includes a cellular telephone transceiver, a WiFi transceiver, and a Bluetooth transceiver, and wherein the companion device is paired through Bluetooth with the first watch and the second watch.

8. The medium as in claim 7 wherein the first watch and the second watch use the same advertising identifier.

9. The medium as in claim 7 wherein the companion device provides a user interface to allow a user to select one or either: automatic watch switching or manual watch switching.

10. The medium as in claim 9 wherein the transmitted data is provided to the second watch automatically without user input.

11. The medium as in claim 10 wherein after detecting the removal and after detecting the attachment but prior to the second watch becoming the active watch the first watch provides health data to the companion device.

12. A method performed by a watch that is paired with a companion device, the method comprising:
   transmitting, through a Bluetooth advertisement message, a wrist state of the watch to the companion device, the wrist state indicating an on-wrist confidence level that is higher than an on-wrist confidence level of another watch, the difference in on-wrist confidence levels indicating a switch from the another watch to the watch;
   receiving data to synchronize the watch with at least one of the companion device or the another watch in response to the switch, the data having originated from the another watch.

13. The method of claim 12 wherein the companion device is one of: a smartphone or a tablet computer and wherein the data is received from the companion device and comprises health data collected by the another watch through sensors on the another watch, and wherein the another watch and the watch are paired with the companion device for Bluetooth communication.

14. A data processing system comprising:
   one or more application processors for executing an operating system and one or more applications on the data processing system which is a wireless communication device, the one or more application processors having at least one sleep state and at least one run state which consumes more power than the sleep state;
   a radio controller which includes filter logic, the radio controller coupled to the one or more application processors to receive, from the one or more application processors, one or more values representing wrist states for processing by the filter logic;
   a radio transceiver coupled to the radio controller, the radio transceiver configured to receive one or more wrist states from an active paired watch and one or more wrist states from one or more inactive paired watches and provide these wrist states to the radio controller, wherein the radio controller is configured, through the filter logic, to prevent waking up the one or more application processors from the sleep state when all of the one or more inactive paired watches have a wrist state that indicates a lower on-wrist confidence level than a most recent wrist state from the active paired watch, and the radio controller is configured, through the filter logic, to wake up the one or more application processors from the sleep state when any one of the one or more inactive paired watches has a wrist state that indicates a higher on-wrist confidence level than the most recent wrist state from the active paired watch.

15. The system as in claim 14 wherein the wireless communication device is one of either a smartphone or a tablet computer.

16. The system as in claim 14 wherein the active paired watch and the one or more inactive paired watches are paired with the data processing system through Bluetooth.

17. The system as in claim 16 wherein the one or more inactive paired watches use Bluetooth advertisements with the same identifier in the Bluetooth advertisements.

18. The system as in claim 17 wherein the Bluetooth advertisements include the wrist states from the one or more inactive paired watches and wherein the radio transceiver is a Bluetooth radio.

19. The system as in claim 18 wherein the one or more application processors wake up to switch which paired watch is the active paired watch.

20. The system as in claim 19 wherein the data processing system and the active paired watch use an encrypted communication protocol on Bluetooth communication signals, the encrypted communication protocol established after the data processing system and the active paired watch have both been unlocked by a user's input.

21. The system as in claim 20 wherein the one or more application processors provide to the radio controller one or more parameters representing a scan interval to cause the radio transceiver to scan for Bluetooth advertisements from the one or more inactive watches.

* * * * *